(12) United States Patent
Erskine

(10) Patent No.: US 7,793,581 B2
(45) Date of Patent: Sep. 14, 2010

(54) RELATING TO IMPACT-RESISTANT STRUCTURES AND ASSEMBLIES

(75) Inventor: James Hamilton Erskine, Downpatrick (GB)

(73) Assignee: Hamilton Erskine Limited, Ballygowan, Newtownards (GB)

( * ) Notice: Subject to any disclaimer, the term of this patent is extended or adjusted under 35 U.S.C. 154(b) by 1007 days.

(21) Appl. No.: 10/566,110

(22) PCT Filed: Jul. 12, 2004

(86) PCT No.: PCT/GB2004/003050

§ 371 (c)(1),
(2), (4) Date: Aug. 16, 2006

(87) PCT Pub. No.: WO2005/014964

PCT Pub. Date: Feb. 17, 2005

(65) Prior Publication Data

US 2007/0011962 A1    Jan. 18, 2007

(30) Foreign Application Priority Data

Jul. 18, 2003  (GB) .................................. 0316863.0
Feb. 18, 2004  (GB) .................................. 0403582.0

(51) Int. Cl.
*F41H 5/24* (2006.01)
(52) U.S. Cl. .................................................. 89/36.04
(58) Field of Classification Search ............... 89/36.04, 89/36.12, 36.13, 36.15, 36.14
See application file for complete search history.

(56) References Cited

U.S. PATENT DOCUMENTS

| 2,679,467 | A |   | 5/1954  | Hervey |
| 2,758,342 | A |   | 8/1956  | Squires |
| 2,850,890 | A | * | 9/1958  | Rubenstein ................. 264/228 |
| 3,558,422 | A |   | 1/1971  | Roseland et al. |
| 3,843,193 | A |   | 10/1974 | Peetz et al. |
| 3,953,630 | A |   | 4/1976  | Roberts et al. |
| 6,145,260 | A | * | 11/2000 | Morton ....................... 52/293.2 |
| 6,161,462 | A | * | 12/2000 | Michaelson ................ 89/36.01 |
| 6,367,210 | B1 |   | 4/2002  | Trundle |
| 2004/0144046 | A1 | * | 7/2004 | Wang et al. ................. 52/204.1 |
| 2005/0115185 | A1 | * | 6/2005 | Telford et al. ................. 52/596 |

FOREIGN PATENT DOCUMENTS

EP    0 306 836 A    3/1989

* cited by examiner

*Primary Examiner*—Stephen M Johnson
(74) *Attorney, Agent, or Firm*—Jenkins, Wilson, Taylor & Hunt, P.A.

(57) ABSTRACT

A transparent assembly locatable in a building surface having a rebate is described. The assembly has a transparent panel and one or more high tensile strength flexible material reinforcement pieces extending laterally from the panel to provide non-rigid attachment of the assembly to a subframe and/or wall, wherein the attachment allows movement of the assembly within the rebate. By direct but non-rigid attachment of the transparent assembly, generally a window, to the subframe and/or wall, any weakness in the impact-resistance of the assembly because of weakness and/or damage to the frame is avoided. The non-rigid nature of the attachment allows it to absorb much of the blast loading. This allows a large load on the transparent assembly to be supported by the subframe and/or wall. The present invention also provides a number of ballistic-resistant and blast-resistant assemblies providing protection against much higher levels of protection from high velocity weapons and explosives.

5 Claims, 8 Drawing Sheets

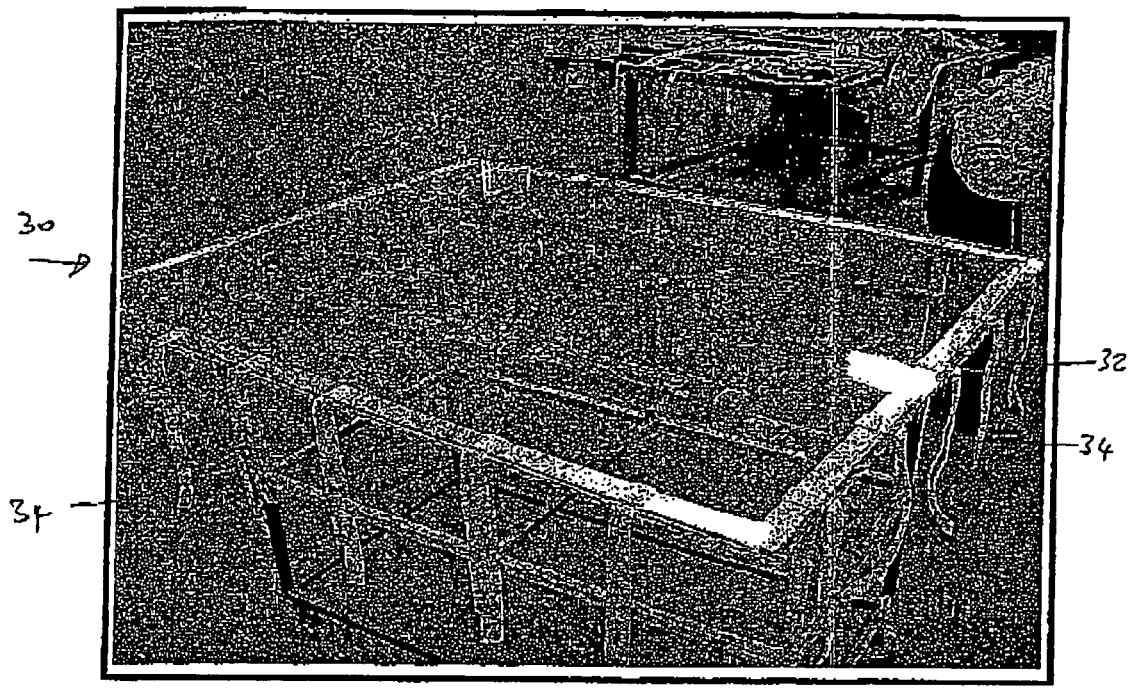
Fig 2
Fig 3
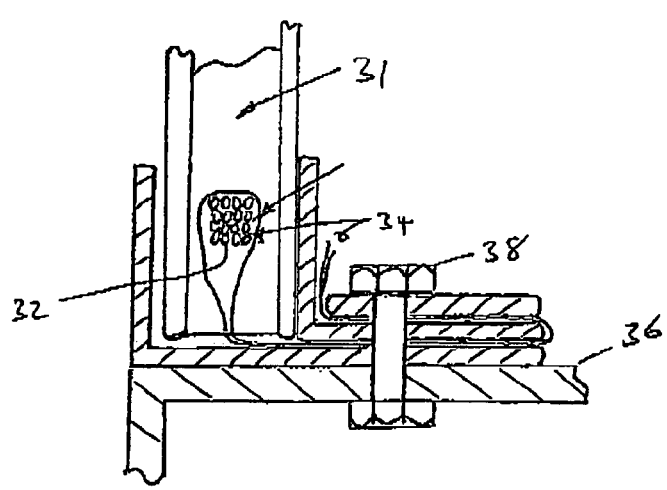

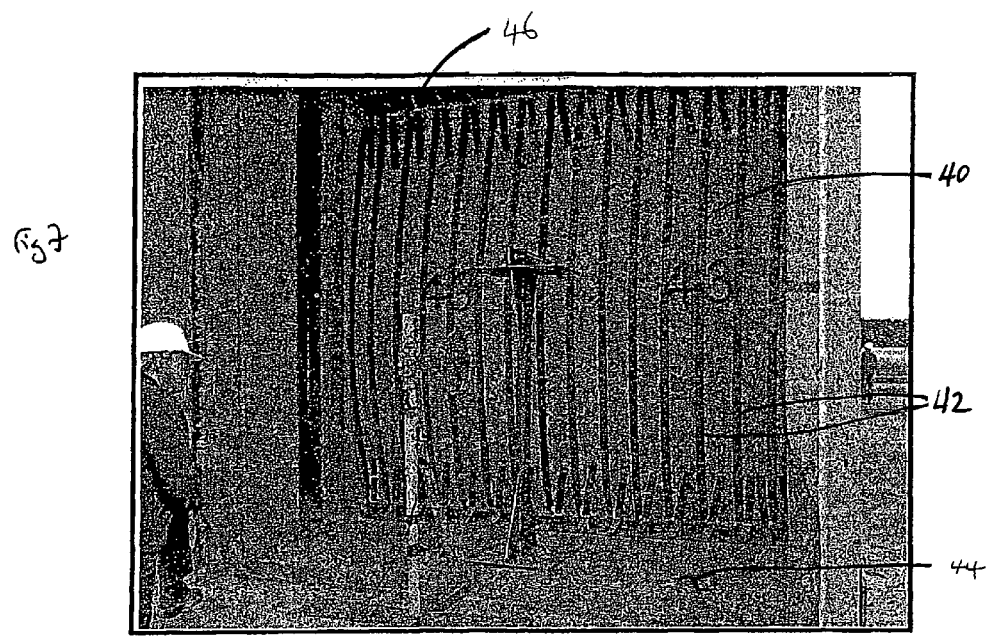
Charge 500kg at 17.5 m,
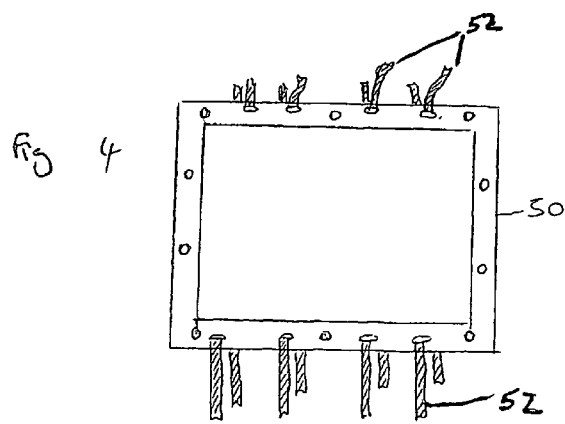

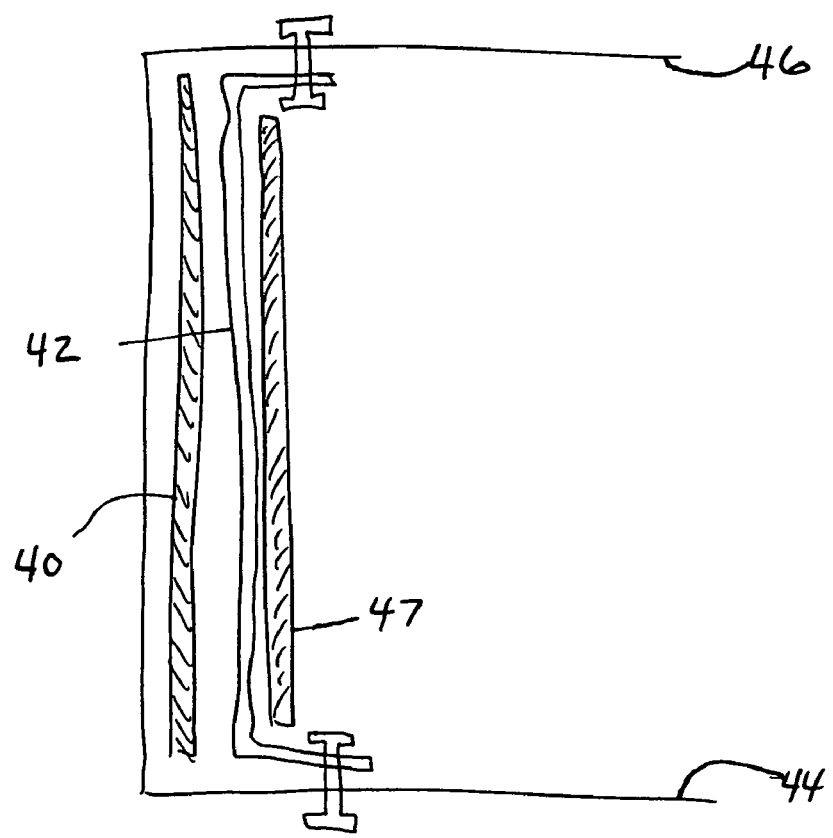

RELATING TO IMPACT-RESISTANT STRUCTURES AND ASSEMBLIES

The present invention relates to improved impact-resistant structures and assemblies such as walls and windows, including ballistic-, blast- and hurricane-resistant optically transparent composite materials involving glass.

In relation to structures and assemblies like permanent or temporary buildings, housings, etc., there have been many suggestions for "blast-proofing" and the like, either for civilian purposes such as for use in aircraft, or for military purposes, especially protection against enemy and terrorist attack. However, with the developing threat from international terrorism and events such as those of Sep. 11, 2001, many governments and major organisations are re-appraising, their security requirements. Better explosives are increasingly available to terrorists and the like. There is now an increasing need for certain key installations, persons and equipment, especially in and around military and high governmental locations, to be protected against a higher level of threat than previously considered necessary.

The increasing power and sophistication of explosive-technology means that 'blast-proof' optically transparent material is also desired having increasing in situ strength and load ability. In this regard, it is now generally desired to provide blast-resistant optically transparent material having the ability to withstand a blast of at least 500 kg TNT (or equivalent) at 40 m, and possibly even higher loadings.

U.S. Pat. No. 3,953,630 discloses a laminated transparent assembly suitable for use as a windscreen for an aircraft wherein high strength flexible material is embedded in a plastic material, laid between two layers of glass. The flexible material extends beyond the transparent assembly, so as to be directly conjoined with the structure of the aircraft. Thus, as any bird impact causes deformation of the transparent assembly (as part of the impact absorption), the high strength "flexible" material provides a direct bond between the aircraft bolts and the transparent assembly, hopefully thereby resisting complete separation of the two and travel of the transparent assembly into the aircraft.

However, U.S. Pat. No. 3,953,630 has three main disadvantages. Firstly, it only discloses the use of polyvinylbutyral (PVB) as the plastic layered to provide the bonding between the glass sheets and the flexible material. Manufacture of the transparent assembly in U.S. Pat. No. 3,953,630 requires an altering of the conventional laminating technique, in order to provide good bonding between a number of PVB sheets, and the glass. This requires pre-heating treatment, insertion of the full assembly including glass sheets in a closed bag to evacuate all air, followed by heating in a autoclave with high pressure. This method of manufacture has not lent itself to cost-efficient production for a number of transparent assemblies, other than for the very special uses such as our aircraft windscreens as mentioned.

Moreover, PVB in particular is a material designed to provide good bonding between glass layers. But it is typically only 1-2 mm thick. PVB cannot be used for thick interlayers, as PVB has little internal strength in its own right, so that its overall strength in lamination is not good.

However, the major disadvantage of U.S. Pat. No. 3,953, 630 concerns its design. All the windows in the examples shown in U.S. Pat. No. 3,953,630 are rigidly attached to or through the window frame. Rigid attachment means that the window and frame cannot absorb any loading. The loading energy cannot be dissipated away. If the frame fails, the whole window will then be unattached from the aircraft, and so 'fail'.

According to a one aspect of the present invention, there is provided a transparent assembly locatable in a window frame having a rebate, the assembly having a transparent panel and one or more high tensile strength flexible material reinforcement pieces extending laterally from the panel to provide non-rigid attachment of the assembly to a subframe and/or wall, wherein the attachment allows movement of the assembly within the rebate.

This assembly is useable in many situations. Indeed, in most buildings and similar structures, it is desired to have a number of windows, and often it is desired for those windows to appear 'normal'. That is, having perfect optical transparency like glass, whilst still being located in a frame with a rebate, and attached to a wall. Thus, the windows can look normal, i.e. like ordinary non-blast proof windows.

It is possible to have windows with large thicknesses of glass, but glass loses transparency with increasing thickness. It is then also necessary to use large and strong rebates and large and strong frames, and such windows and frames no longer look 'normal'.

By direct but non-rigid attachment of the transparent assembly, generally a window, to the subframe and/or wall around the frame, any weakness in the impact-resistance of the assembly because of weakness and/or damage to the frame, generally a window frame, is avoided. The non-rigid nature of the attachment allows it to absorb much of the blast loading. This allows a larger load on the transparent assembly to be supported by the subframe and/or wall.

Indeed, the present invention is further advantageous because the impact-resistance of the assembly is also no longer reliant on the strength of the fasting means between the frame and the surrounding subframe or wall. Window frames are generally fixed to the surrounding subframe or well using metal screws or bolts. Whilst the bolts generally do not fail, it is often the case that the material surrounding the bolt, such as the concrete and the wall, breaks or crumbles upon sudden impact-loading, resulting in the entire window and window frame separating from the surrounding subframe or wall, and travelling inwardly into the building, with attendant effect. Thus, however strong the glass has been made, this has no benefit if the surrounding frame is likely to come away from the subframe or wall anyway upon impact-loading.

The present invention is designed to assist with the transparent assembly, and any surrounding frame, by the attachment of the reinforcement pieces to a subframe and/or the wall. Thus, the strength of any frame used is not as important. This means that 'lighter' frames can be used with the present invention compared to the type of heavy and/or reinforced frames normally used for blast-proof buildings. With the use of lighter frames, the windows can look more aesthetically pleasing and thus 'normal' than is currently the case for bomb-proof buildings.

The present invention works in that the flexible reinforcement pieces hold the glass in place, and by allowing some slack or stretch into these pieces, they can absorb much of the blast loading. A rebate is still used, but the majority of the loading is passed along the flexible reinforcement pieces to the subframe or wall. As long as the assembly stays within the dimensions of the rebate, and the assembly material has not been fully breached by the blast, then the window is considered to be secure according to official blast-testing requirements.

The assembly could include metal, plastic or rubber dampers devices to further absorb the kinetic energy of a blast impact.

The transparent panel of the assembly could be homogeneously formed from a single material such as a polycarbonate. Polycarbonates have a high optical transparency, and high strength. Other such materials include (PET) polyethylene. Optionally, these materials could have one or more glass layers laminated therewith.

In another embodiment of the present invention, the transparent panel is formed from at least one glass layer and at least one polyurethane clear cast resin layer to form a lamination, and wherein the or each reinforcement piece extends from a resin layer.

One range of polyurethane clear cast resins are provided by Chemetall GmbH of Frankfurt, Germany, and generally defined in their International Patent Application No WO 01/38087A1. They term them "PRR" resins. The term "PRR" refers to 'polycarbonate replacement resins'. The PRR materials are a range of transparent cast resins that can consist of reactive acrylate and methacrylate monomers, acrylate and methacrylate oligomers, bonding agents and initiators. The is content of WO 01/38087A1 defining these materials is incorporated herein by way of reference.

The term "PRR" also extends to similarly provided polyurethane resins, often termed "PUR".

A range of commonly available resin materials are sold under the trade name Naftolan®. The Naftolan materials are provided in a range of different formulations to provide slightly different properties. These polyurethane resin materials have been found to have several advantages over previously used polymer glass lamination layers. Firstly, the refractive index of polyurethane resins overlap very closely with many types of glass. Secondly, polyurethane resins have been found to expand and contract at very close rates with that of glass, thus leading to minimal if ever cracking or delamination (due to internal stress) during any thermal expansion and contraction of the composite material. Thirdly, polyurethane resins are relatively very easy to use and set in transparent composite materials, especially compared with processes of caring previously used types of polymers and resins. They are also useable in designs incorporating complex curves.

Because polyurethane resins have a co-efficient of expansion and contraction very close to glass, these materials are usable to provide optically transparent composite materials with glass over a much greater range of temperatures than, e.g. that shown in U.S. Pat. No. 5,665,450. In particular, the present invention is designed to provide an impact-resistant optically transparent composite material which is usable at temperatures even as low as −15° C. to −40° C., generally −20° C., e.g. the temperature of windows in military installations in certain countries such as Canada, as well as temperatures going up to 30° C. to 40° C., such as the temperature of windows in more tropical countries. To that extent, the difference in co-efficiency of glass, such as a normal silica-based glass, and PRR materials, deviates little over a wide temperature range.

In general, the refractive index of the polyurethane resin are sufficiently close to readily available types of glass, such as a silica-based glass, that the optical transparency of the composite material of the present invention is as good as that from any current glass/glass or glass/PC laminations.

As well as the greater similarity of refractive index and co-efficient of thermal expansion of polyurethane clear cast resins with glass, the resin-flexibility and glass bonding has been found to be superior to that of prior materials such as PVB.

The high tensile strength flexible material may be similar to that disclosed in U.S. Pat. No. 3,953,630, i.e. woven fabric or woven glass fibre material or polyester fibre material. One such product is Kevlar®. The flexible material may also be metal, such as thin strips.

The flexible material could extend wholly or substantially around opposites sides of the complete transparent assembly, to provide flexibility of attachment to the surround. It could also extend as a series of discrete straps.

For the impact-resistant material described hereinabove, the thickness of the glass and resin layers of the blast-resistant assembly can follow those well known in the art. One suitable dimension for a glass/resin/glass lamintion transparent panel is 4 m glass, 4 mm PRR and 3 mm glass.

The thickness of the PRR layer can indeed be up to 40-50 mm thick, as PRR has inherent strength independent of thickness as mentioned above. To that extent, the PRR material can be as thick and therefore as strong as desired, as most of the strength from a blast is taken by the resin (whilst any glass shatters).

A third disadvantage of U.S. Pat. No. 3,953,630 is the lack of reinforcement in the window pane.

Thus, according to another embodiment of the present invention, the or each resin layer includes directional fibre reinforcement at or near each edge of the resin layer, and wherein the or each reinforcement piece loops around the fibre reinforcement.

The fibre reinforcement may be any suitable reinforcement means known in the art. As it is intended only to be at or near the edges of the assembly, the reinforcement pieces need not be in any way wholly or partly transparent, and could even be hidden within any framing used for the assembly, such as a window frame.

Preferably the fibre reinforcements are unidirectional glass fibres, whose direction follows the edge direction of the resin layer. More preferably, the fibre reinforcements are cast in the resin layer simultaneously with casting of the resin.

The flexible material reinforcement pieces suitable for the above aspects of the present invention may be pieces of wepping or similar as are well known in the art, such as aramid (Kevlar®), and as hereinbefore described. Preferably, the pieces are of sufficient length to allow their attachment along from the glass and resin part, and/or any assembly frame involved, such as a window frame.

Thus, impact loading on the transparent assembly, generally a window, is passed through or across the frame to the subframe and/or wall, such that the frame can fail but the window remains attached or 'in place'. Secondly, the reinforcement pieces (preferably with some slack therein) have sufficient 'give' in them to reduce the shock loading, meaning less loading is put on the subframe and/or wall.

An example of such a laminated transparent assembly, as shown in FIG. 2 herewith, has been tested by the UK Home Office against a 100 kg charge at a stand-off of 21 m, and has withstood the blast successfully.

In the present invention, the ability to provide a polyurethane clear cast resin of any thickness provides a further benefit.

Thus, according to another aspect of the present invention, there is provided a blast-resistant composite material comprising at least one layer of polyurethane clear cast resin having at least one reinforcement piece extending wholly or substantially across the resin layer.

Preferably, the reinforcement piece is a strip or bars or other reinforcement means. There is preferably a series of such pieces, more preferably forming a grid or grid-like structure wholly or substantially across the composite material. An example is shown in FIG. 9 herewith.

The resin material is that as defined hereinabove. The reinforcement piece can be one or more of woven roving, webbing, webbing material or even metal material. The use of a metallic grid provides the same effect as a "muntin" system which uses metallic reinforcement grid alongside a glazing panel, but not actually therein. The present invention therefore achieves the same effect and strength as a muntin system, but as a one piece assembly, thereby significantly reducing assembly and installation, and with the added advantage of stretch to absorb shock.

The blast-resistance is achieved because the polyurethane resin layer can be any thickness desired, e.g. up to 40-50 mm, which is able to accommodate reinforcement pieces, whereas previous resins were not able to achieve such thickness, and thereby accommodate reinforcement therein.

The benefit of achieving reinforcement within the polyurethane resin is that each 'section' created by the reinforcement piece or pieces, e.g. each small section within the grid, can be regarded as having its own frame, as thus regarded as a separate section in terms of analysis against blast. As is well known in the art, the blast-resistance of a small section is greater than that of a large section. By dividing the composite panel into a number of small sections, significant blast-resistance is achieved.

It is noted that the optical transparency of blast-resistant panels using for example the muntin system is not as important as that described for other aspects of the present invention, so that the comparative refractive index is not as important as that as described above in relation to other aspects of the present invention.

Turning to impact-resistance structures, a further important feature of any impact-resistant window is ensuring that the surrounding frame and even the surrounding wall are sufficiently strong to support the window and survive the impact such as a explosive blast. Any system with little or no 'give' i.e. a rigid system, suffers much higher stresses the one which allows some flexibility, elasticity or give within it. Even apparently rigid structures such as walls will flex under loading.

The present invention therefore also provides a surface-reinforcement assembly designed to allow flexibility to a surface such as a wall, floor or ceiling or the like, whilst also reinforcing its strength.

Thus, according to a further aspect of the present invention, there is provided a wall-reinforcement assembly for a wall having an adjacent floor and ceiling, comprising a first wall-adjacent layer formed wholly or substantially of fibre reinforced composite flexible material, and a second layer comprising one or more high tensile strength flexible material reinforcement pieces, wherein at least one of said reinforcement pieces is secured to the floor and/or the ceiling.

The terms "wall", "floor" and "ceiling" are interchangeable in the sense that the wall-reinforcement assembly is usable on a floor, wall or ceiling, having appropriate other structures therearound to form an internal part of a building or the like. The reinforcement pieces are preferably, secured to a 'strong' floor, such as made of concrete, and a 'strong' part of a ceiling such as a reinforced concrete ring beam or steel I-section now commonly used in building construction, more preferably through set fixing points.

The first composite layer is preferably a sheet of glass fibre reinforced plastic or kevlar material, either loose or in resin, which is able to extend across the area of the wall to be reinforced. In particular, this layer provides a layer of protection from small fragments being dislodged by any blast or other impact causing flexing of the wall. The thickness of this layer can be varied to bolster the physical attack and ballistic protection of the wall.

The second layer preferably comprises a series of parallel straps, such as webbing straps. The reinforcement pieces could run horizontally, as well as vertically, or indeed both. The material of the reinforcement pieces is selected for its strength and ability to stretch under shock loading.

The assembly could include a third layer adapted to provide a suitable internal finished layer, as well as possibly including the appropriate level of installation, fire resistance, etc. and internal fittings such as electrical sockets.

The assembly could be retrofitted to an existing wall or other surface, or included as part of a purposed built design.

The assembly could be formed to be the size of the wall or other surface on which it is to be located, or be formed in modular form, e.g. made in panels, which are joined together to make the desired or necessary size in-situ.

In general, the present invention provides the ability to consider the impact-resistance across a complete portion of a building, especially a wall which can include one or more windows, doors or other openings.

Thus, the present invention also provides an impact-resistant system comprising the conjunction or combination of the transparent assembly as herein described, as a window, and the wall-reinforcement assembly as also herein described.

An example of the system includes a wall-reinforcement assembly as hereinbefore described, in combination with a laminated transparent assembly as hereinbefore described in a form of a window, wherein the flexible material reinforcement pieces of the assembly combine, either integrally or through conjunction means, with the flexible material reinforcement pieces of the window assembly. In this case, the window reinforcement pieces are attached to the frame.

In a second example, the material reinforcement pieces of a wall reinforcement assembly as hereinbefore described extend internally through a window assembly as hereinbefore described, such that the reinforcement pieces are secured by the cast resin in the window, and are of sufficient length to enable the pieces to be secured at the fixing points at the top and bottom of the wall being reinforced by the assembly. This design also allows for securing non-glass windows such as polycarbonate, which may be desired where the emergency or hazardous nature of the work conditions are not suitable for handling glass.

It will be recognised by these skilled in the art the composite materials and assemblies could also be used to provide hurricane or the like resistance, and thus the present invention is extended thereto. The term "impact" as used herein refers to any type of severe blow such as an explosion, bullet, wind, etc. Blast-resistance generally relates to resistance against an explosion.

Meanwhile, in relation to ballistic-resistance, there are many available materials having high strength and ballistic-impact resistance where pure optical transmission for a window is not a necessity. However, where optical transparency of 'normal' windows and glazing is desired, e.g. for military base houses and offices, the current usual forms of glazing (i.e. not overly thick, and having 100% clarity) are only adequate for protection against low velocity bullets (e.g. from small arms), and low levels of blast. Most current forms of 'bullet proof' glass use several layers of glass bonded by adhesive polymer film. The energy of the projectile is dissipated over increasingly large areas of blast. To some extent the projectile can be deformed or fragmented and can be deviated from the original line of attack. The energy is directed towards a direction different to the previous path, resulting in further dissipation of energy.

Typical design solutions involve either glass/glass combinations or glass/polycarbonate (PC) combination. The latter offer an advantage in that they are lighter than the former, but they often have delamination problems. The effect of bonding of PC to glass is also difficult as PC has a substantially higher rate of thermal expansion than glass. This causes high stress levels in the bonding interlayer during temperature changes which often leads to delamination.

The PC designs are often 'complex', particular as the level of protection required increases. The number of layers can cause problems with optical interference and secondary image formation because of the number of glass/PC interfaces. There may also be weight or thickness limitations preventing their use in particular applications. This is shown in the following table.

| Weapon type & Calibre | Class | Design | Thickness (mm) | Weight (kg/m$^2$) | Transmittance (%) |
|---|---|---|---|---|---|
| Hand Gun 9 mm Luger | BR2/C1 | $6^2$PC$5^2$3-12-ESG6 | 35 | 47 | 77 |
| Rifle 0.223 (5.56 * 45)hc | BR5/C3 | $8^26^2$PC$6^26^2$PC6 $8^2$PC$8^2$6-12-$6^2$PC$8^2$3-20-ESG6 | 39 82 | 71 95 | 64 ? |
| Rifle 0.308 (7.62 * 51) | BR6/C4 | $8^28^26^2$PC$6^26^2$PC6 $8^2$PC$8^2$3-12-$10^2$PC$8^2$3-20-ESG6 | 49 85 | 93 102 | ? ? |
| Rifle 0.308 (7.62 * 51)hc | BR7/C5 | $6^28^28^2$PC8-20-$6^28^2$82PC8 | 91 | 143 | 58 |

U.S. Pat. No. 5,665,450 discusses the introduction of glass fibres and glass ribbons into transparent composites, but, as it states, the introduction of glass fibres into an optically transparent polymer destroys the transparency of the polymer.

U.S. Pat. No. 5,665,450 considers that the introduction of glass ribbons provide a higher degree of optical clarity and lower level of distortion than glass fibres. However the photographs in U.S. Pat. No. 5,665,450 indicating the degree of optical clarity of fibre and ribbon-reinforced materials still show distortion even based on photographic reproduction of relatively indistinctive photographs. FIG. 7 shows percentage like transmission as a function of temperature and wavelength. However, it can be seen that the percentage transmission barely gets above 80% at the lowest temperature and highest wavelength measured. The lowest temperature measured is at 30° C., which is also not a temperature generally encounted in many countries on a regular basis. It is interesting that the percentage transmission in U.S. Pat. No. 5,665,450 was not measured at more temperate or freezing temperatures. Moreover, 80% optical transmission is very poor in comparison with the expectancy of 'normal' glass, which should be at least 90% at all temperatures. It is appreciated that the human eye can easily recognise or perceive a less than 100% optical transmission of light through a 'transparent' material.

In essence, there is a requirement for an optically transparent composite material having about or at least 90% optical transmission over a range of temperatures, including below 0° C., and also able to withstand high velocity ballistic projection whilst having a relatively low manufacturing cost.

According to another aspect of the present invention, there is provided an optically transparent composite material comprising at least one glass/resin/glass lamination, wherein the resin is a polyurethane clear cast resin having optical fibre-reinforcement therein.

Useable polyurethane clear cast resins include those hereinbefore described.

The fibre reinforcement in the resin layer of the composite material of the present invention can be provided by any known type of "fibre material", being for instance in the form of filaments, or in the form of particles such as beads, or even powders, as long as such fibre material wholly or very substantially has the same refractive index as glass across all or most the wavelengths of optical light. Such glass fibres are well known in the art, one such available product being sold under the trade name Tyglas by Fothergill Engineered Fabrics.

The fibre reinforcement provide the polyurethane resin intermediate layer with improved strength because of their well known ability to laterally transmit impact energy. Meanwhile, polyurethane resins also have improved utility as a resin to band the fibre material fillers because of their similar co-efficient of thermal expansion and adhesive strength to glass.

In the present invention, the thickness of the glass and polyurethane resin, and the density of fibre reinforcement in the resin layer, can vary according to the qualities of the final composite material desired, and varied independently of the glass layer thickness. Indeed, the thickness of the resin layer(s) can be virtually any thickness, as their clarity is usually extremely good, independent of thickness, unlike glass whose clarity lessens as its thickness increases. Polyurethane resins are also lighter than glass, and naturally a thicker layer is stronger than a thinner layer. Cost and physical properties are factors in considering the thickness of the layers. One known ratio of thickness is glass/PRR/glass of 6/20/4 mm; this is provided by way of example only. Another suitable dimension is 4/4/3 mm.

In contrast, many existing types of resins and adhesives only have strength for a minimal thickness, as their use is to bond together the layers (e.g. of glass) on each side, rather than provide any inherent strength of their own right. Polyurethane resins been found not only to provide good bonding to glass, but also have internal strength in its own right. The thickness of the polyurethane resin layer is therefore independent of the thickness of the glass layers either side.

The nature of "high velocity ballistic protection" can be defined in general terms as the difference between a hand gun and a rifle, e.g. above a NATO 5.56 or 7.62 mm ball.

According to another aspect of the present invention, there is provided a process for making an optically transparent composite material as herein before defined, comprising the steps admixing the polyurethane clear cast resin with the optical fibre-reinforcement, and allowing the combination to cure and set between the two layers of glass.

Further information on the curing of polyurethene resins may be found in WO 01/38087A1.

Embodiments of the present invention will now be described by way of example only and with reference to the accompanying drawings in which:

FIG. 2 is a perspective photograph of the transparent assembly in FIG. 1;

FIG. 3 is a cross-sectional part view of a laminated optically transparent assembly according to a second embodiment of the present invention attached to a wall and subframe;

FIG. 4 is a schematic front view of a laminated optically transparent assembly according to a third embodiment of the present invention;

FIG. 7 is a perspective photographic view of a wall-reinforcement assembly according to an embodiment of the present invention;

FIG. 12 is a schematic cross-sectional view of a wall-reinforcement arrangement according to another embodiment of the invention with an internal layer.

Figure 1:
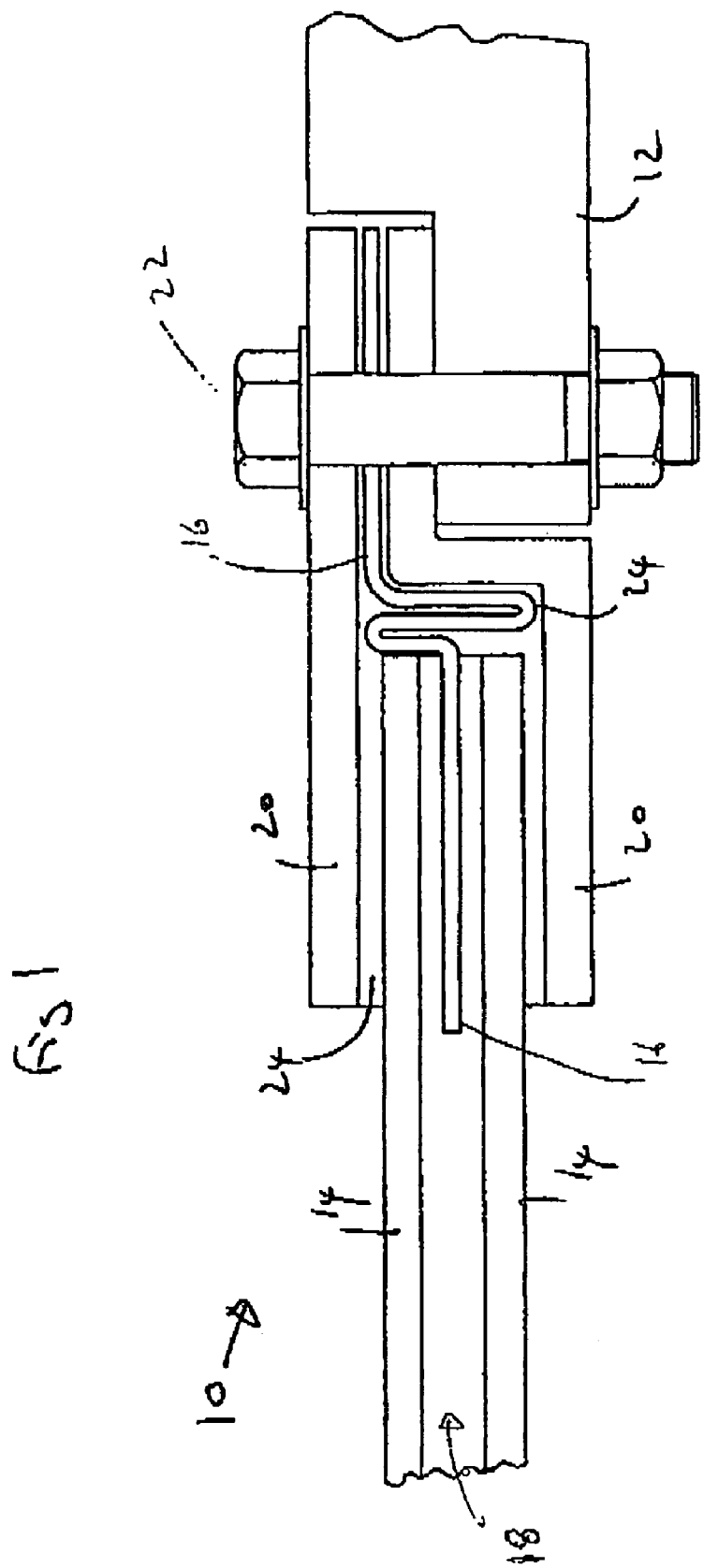
FIG. 1 is a cross-sectional part view of a laminated optically transparent assembly according to a first embodiment of the present invention in a frame and wall.

FIG. 1 shows a blast-resistant assembly 10 mounted to a wall 12. Between the two panes of glass 14, a 2 inch wide unidirectional glass fibre woven roving 16 was bonded into the PRR resin 18. The complete assembly 10 was located in the rebate of a window frame 20, and the roving reinforcement material 16 fixed to the frame 20 by adhesive 24, and after leaving a slack section 24, to the wall 12 by means of a lateral bolt 22.

The assembly 10 was tested in a Hannsfield 20 k-w tensometer. Loads in access of 8000 N were applied before the fibre woven 16 broke. Considerably greater loads could be achieved with the use of thicker fibres or different types of fibres. The slack section 24 took up some of the load as the window flexed under the loading, and also transferred the load directly to the wall 12, whilst keeping the window within the rebate.

FIGS. 2 and 3 show a similar blast-resistant window assembly 30 as that partly shown in FIG. 1, but wherein the Naftolan resin intermediate layer 31 includes a complete loop of unidirectional glass fibre 32 around the perimeter of the resin and glass lamination and inside two panes of glass 33. Lengths of webbing material 34 acting as high tensile strength flexible material reinforcement pieces are wrapped around the loop of unidirectional glass fibre 32, and the loose ends of the webbing material 34 extend outside the glass and resin lamination. Thus, the lengths of webbing material 34 are bonded into the resin layer, and are also wrapped around the unidirectional glass fibre 32 that is bonded into the resin. The loose ends of the webbing material 34 are then secured by a bolt 38 directly to a subframe or wall 36 as shown in FIG. 3.

The arrangement in FIG. 3 still has the glass 33 and resin 31 transparent assembly in the rebate of a frame 35, but the glass/resin lamination is directly secured in place by the webbing material 34 rather than by any securement in the window frame 35. This allows for the use of different types of webbing or other materials as the reinforcement pieces to ensure the correct strength as required and to absorb an appropriate shock load.

The length or webbing material 34 can also be adjusted to allow some slack, which further assists with the absorption of a shock load. In this way, failure of the window frame or rebate does not result in detachment of the window from the wall. Moreover, the loading against the window is passed through to the subframe or wall 36.

FIG. 4 shows a window assembly similar to that shown in FIGS. 1 and 2, wherein the reinforcement piece 50 extending laterally from the resin layer has a series of holes, through which suitable reinforcement pieces such as webbing straps 52 can be entered, so as for attachment to a wall or subframe, or also to be the reinforcement pieces for use in FIG. 7 hereafter. That is, the wall-reinforcement assembly in FIG. 7 is able to accommodate opening such as windows and doors, and the reinforcement pieces can be conjoined or interlinked or formed as one, so as to provide the strongest arrangement for strength and elasticity across the whole wall surface.

Figure 5:
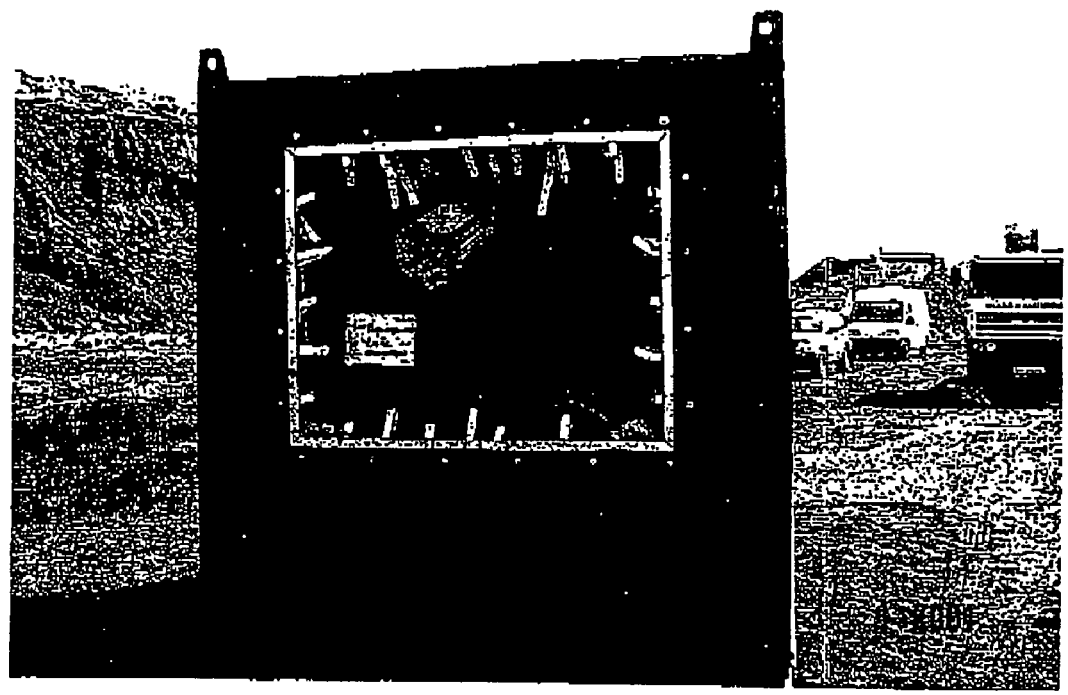
FIGS. 5 and 6 are perspective photographic views of first and second polycarbonate transparent panels after impact loading.
Figure 6:
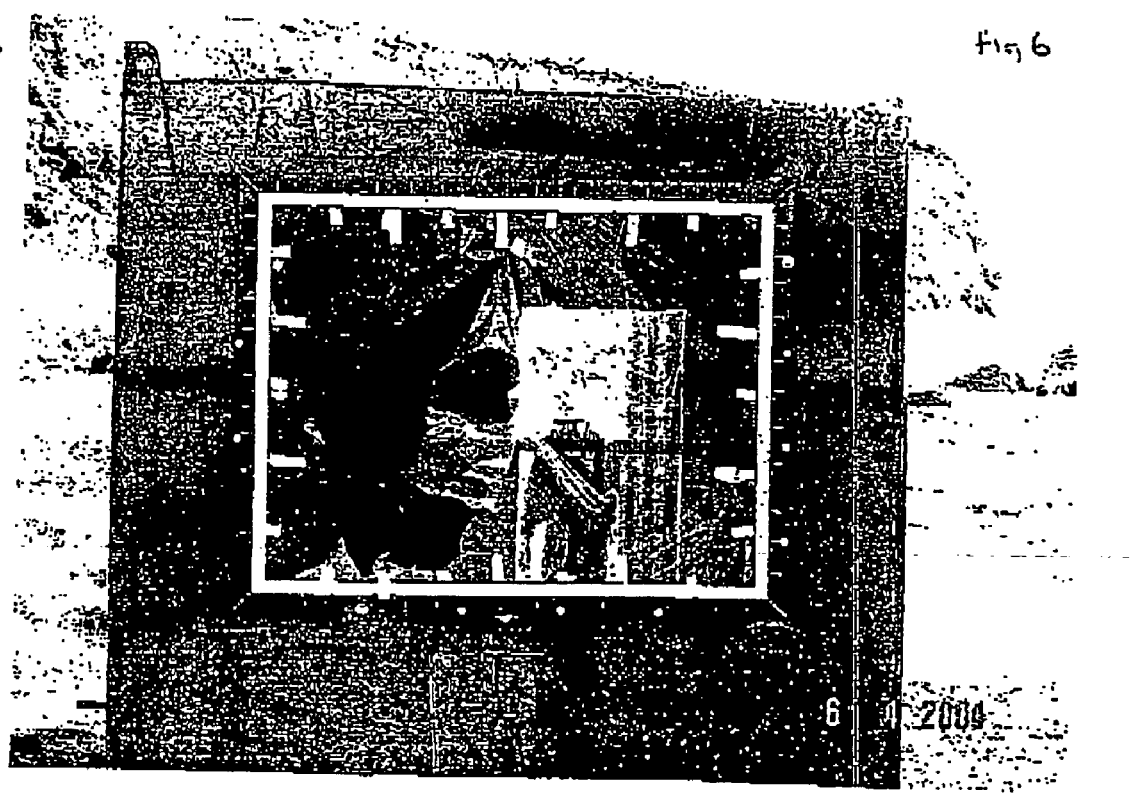

FIGS. 5 and 6 each show a sheet of 6 mm polycarbonate held at its edges by 1 inch wide nylon webbing. Holes were made around the periphery of the polycarbonate sheets in the staggered manner, to prevent crack formation. The sheets were approximately 1.5×1.25 m in dimension. Each sheet was fitted in a simple aluminium frame with the webbing secured to the surrounding subframe. The window assembly in FIG. 5 allowed approximately 1 inch of slack in the webbing as it extended from the transparent panel assembly to the fixings with the subframe. The window assembly in FIG. 6 had the webbing pulled taut before the blast.

Both windows were then tested to EXR1 standard (3 kg TNT equivalent at 5 m). The FIG. 6 window which was held taut failed and the FIG. 5 one with loose attachments i.e. the one which could absorb the shock loading, survived. This test showed the utility of the attachment system to absorb shock loadings and also that it can work with a variety of materials including polycarbonate sheets.

Figure 10:
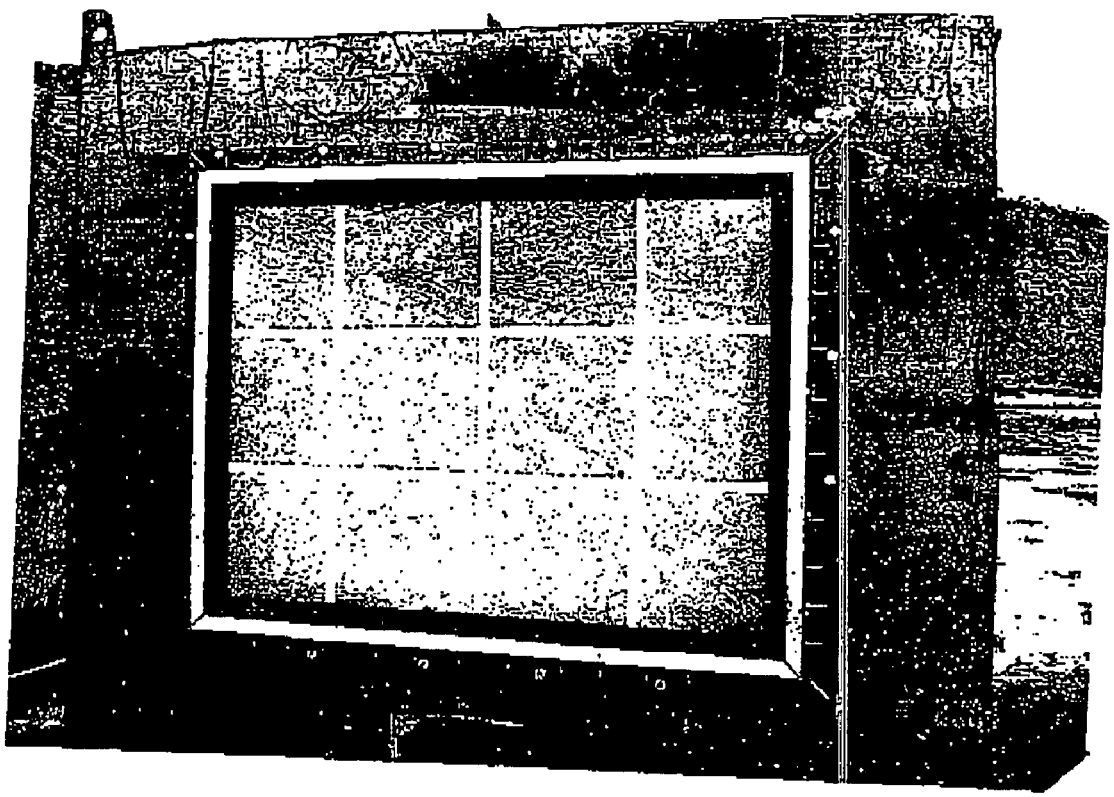
FIG. 10 is a perspective photograph of a muntin system according to another embodiment of the present invention.

A further example of the utility of the system involved a window of 4 mm clear cast resin between two layers of 4 mm toughened glass. The window was further reinforced with 1" wide polypropylene webbing as shown in FIG. 10 to make a muntin-like system. Toughened glass is more flexible than normal glass which helps absorb some of the shock loading. (Laminating toughened glass with pvb is very difficult). The webbing running through the windows is designed to be flexible and assist the clear cast resin in absorbing some of the loading.

The window was held in a simple aluminium frame using the attachment system mentioned earlier. The window was tested with 12 kg TNT equivalent at 5 m and survived the blast. Of particular note was that there was no damage to the aluminium frame as the loading was passed to the subframe and that there was little or no glass separating from the resin despite both panes of glass (inner and outer) surface having flexed to the point of breaking.

FIG. 7 shows a wall-reinforcement assembly comprising a first wall-adjacent layer 40 formed from glass fibre reinforced plastic material. This layer of 40 provides protection from small fragments being dislodged from the wall following any blast impact. The thickness of the layer could be varied improve to the physical attack and ballistic protection of the wall. A second layer 42 comprises a series of vertical webbing straps running between fixing points in the floor 44 and ceiling 46. Once again the webbing straps act as high tensile strength flexible material reinforcement pieces, and their actual material and width can be chosen to achieve the correct balance of strength and elasticity/stretch for a shock loading.

The arrangement shown in FIG. 7 was able to resist a charge of 500 kg of TNT equivalent at a distance of 17.5 m from a wall of brick and block with a cavity foam insulation, similar to 'standard' house-wall construction in the UK. That is, the blast did not puncture the reinforcement assembly.

Figure 8:
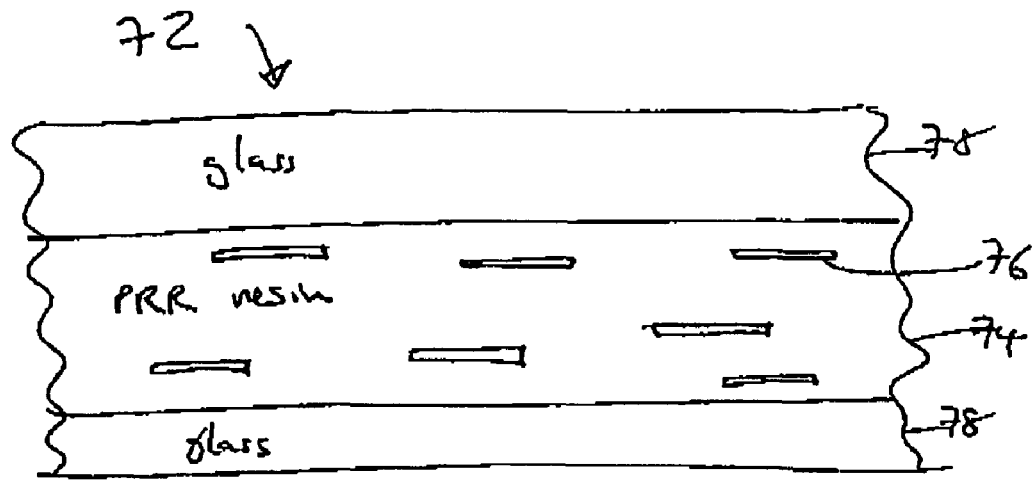
FIG. 8 is a cross-sectional view of a optically transparent composite material according to one embodiment of the present invention.

FIG. 8 shows a optically transparent composite material 72 comprising a glass/resin/glass lamination. Within the PRR resin layer 74 are a series of traditional fibre glass woven rovings 76.

To produce the material, the rovings 76 were secured between two panes of glass 78, and the PRR resin 74 was injected into the cavity. The resin 74 flows up the inside of the glass 78 and disperses through the woven roving 76, wetting the fibres and forming an excellent bond.

Figure 9:
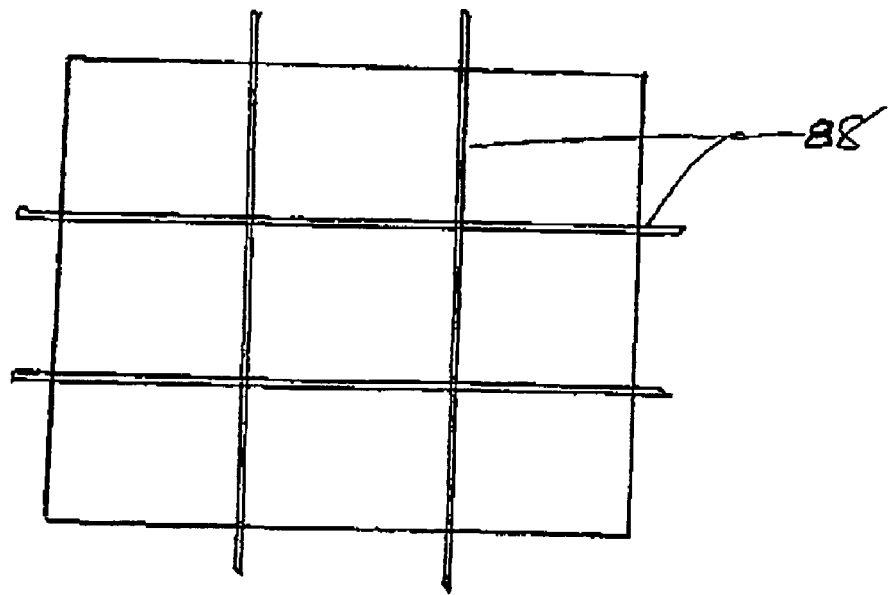
FIG. 9 is a schematic front view of a reinforced laminated optically transparent assembly according to an embodiment of the present invention.

FIG. 9 is schematic front view of a blast-resistant composite material for a window or similar wherein a series of horizontal and vertical reinforcement webbing straps 88 extend through the intermediate resin layer to form a net or a grid pattern. The webbing pieces 88 could extend further so as to be part of the webbing arrangement shown in FIG. 7.

Figure 11:
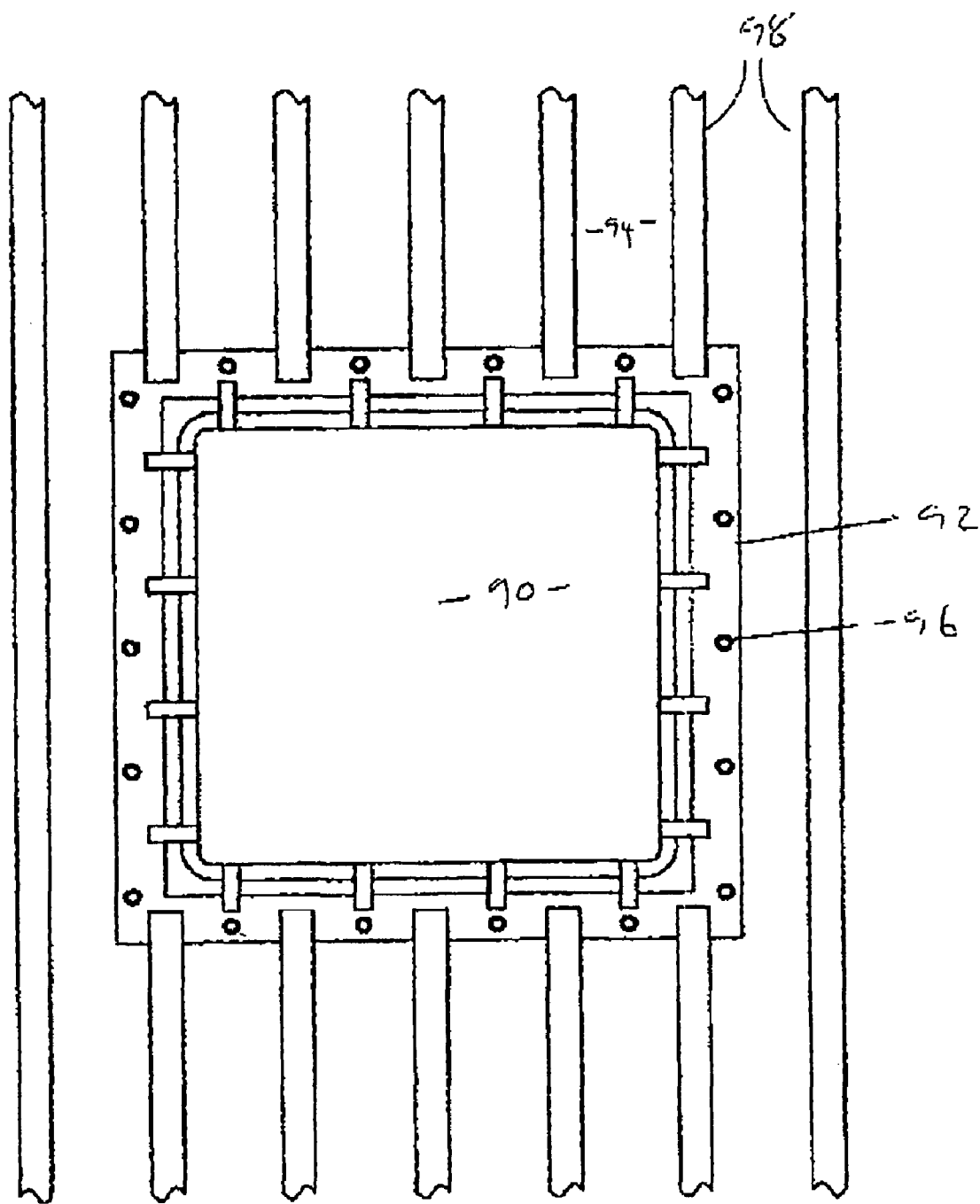
FIG. 11 is a schematic front view of a window and wall-reinforcement arrangement according to another embodiment of the present invention.

FIG. 11 shows a window and wall-reinforcement assembly according to another embodiment of the present invention, having a central glass and resin panel 90, fastened to a window frame 92 in a manner 8 hereinbefore described. The frame 92 is bolted to a wall 94 via bolts 96. Down the wall 94 are arranged a series of reinforcement pieces 98 as hereinbefore described for wall-reinforcement assembly. In the arrangement in FIG. 11 those reinforcement pieces 98 in line with the frame 92 are secured to the frame 92, so that any impact loading on the window panel 90 is transferred through the frame 92 and to reinforcement pieces 98 in a non-rigid manner, thereby preventing immediate dislodgement of the frame 92.

A third layer 47 may be added as an internal finished layer as shown in FIG. 12.

The present invention provides ballistic-resistant and blast-resistant assemblies providing protection against much higher levels of protection from high velocity weapons and explosives than currently known with current forms of wall and glazing. Production of the assemblies is also comparatively simple and cost effective compared to previous types of similar assemblies, which used less suitable polymers and plastic material.

The invention claimed is:

1. A window and wall reinforcement assembly comprising:
a wall-reinforcement assembly for a wall of a building structure having an adjacent floor and ceiling, comprising a first wall-adjacent layer formed wholly or substantially of fibre reinforced composite flexible material, and a second layer comprising flexible material reinforcement pieces having a balance of strength and flexibility selected for shock loading, wherein said reinforcement pieces are secured to the floor and/or the ceiling of the building structure; and
a transparent assembly having a frame, a transparent panel and one or more flexible material reinforcement pieces having a balance of strength and flexibility selected for shock loading, the flexible material reinforced pieces of the transparent assembly extending laterally from the panel to provide non-rigid attachment of the panel to the frame, in conjunction with the wall-reinforcement assembly, wherein the frame is secured to the reinforcement pieces of the wall-reinforcement assembly so that impact loading on the panel is transferred through the frame and to the reinforcement pieces of the wall reinforcement assembly in a non-rigid manner.

2. The window and wall reinforcement assembly as claimed in claim 1 wherein the reinforcement pieces are secured to a rigid part of the floor and/or the ceiling.

3. The window and wall reinforcement assembly as claimed in claim 1 wherein the first composite layer is a sheet of glass fibre reinforced plastic or aramid material, either loose or in resin, extending across the area of the wall to be reinforced.

4. The window and wall reinforcement assembly as claimed in claim 1 wherein the pieces of the second layer comprise a series of parallel straps.

5. The window and wall reinforcement assembly as claimed in claim 1 wherein the assembly includes a third layer adapted to provide an internal finished layer.

* * * * *